United States Patent [19]
Chau et al.

[11] Patent Number: 5,858,277
[45] Date of Patent: Jan. 12, 1999

[54] AQUEOUS PHOSPHOR COATING SUSPENSION FOR LAMPS

[75] Inventors: Chung-Nin Chau, Sayre; Steven C. Fowler, Canton; John S. Tulk, Towanda, all of Pa.; Paul W. Salvi, Andover, Mass.; Tracy V. Silloway, Hampton, N.H.; Karen Lee, Salem, Mass.

[73] Assignee: Osram Sylvania Inc., Danvers, Mass.

[21] Appl. No.: 997,279

[22] Filed: Dec. 23, 1992

[51] Int. Cl.⁶ .................................................. B05D 5/06
[52] U.S. Cl. ......................... 252/301.4 F; 252/301.4 P; 252/301.36; 427/64; 427/67
[58] Field of Search ........................ 252/301.36, 301.4 P, 252/301.4 F; 427/64, 67

[56] References Cited

U.S. PATENT DOCUMENTS

| | | | |
|---|---|---|---|
| 2,976,249 | 3/1961 | Rimbach et al. | 252/301.4 P |
| 3,470,106 | 9/1969 | Vodoklys et al. | 252/301.4 P |
| 3,679,452 | 7/1972 | Ropp | 427/67 |
| 4,147,816 | 4/1979 | Schevrs | 427/67 |

FOREIGN PATENT DOCUMENTS 7506340  12/1975  Netherlands ............................ 427/67

*Primary Examiner*—Melissa Bonner
*Attorney, Agent, or Firm*—Robert F. Clark

[57] ABSTRACT

An aqueous coating suspension for a fluorescent lamp comprises particles of an alkaline earth chlorofluorophosphate phosphor activated by antimony and manganese, water, at least one water soluble binder, a defoaming agent, a surface active agent and a sufficient amount of ammonium chloride for improving lamp maintenance.

6 Claims, No Drawings

AQUEOUS PHOSPHOR COATING SUSPENSION FOR LAMPS

TECHNICAL FIELD OF THE INVENTION

This invention relates an aqueous phosphor coating suspension of the type typically used in the manufacture of fluorescent lamps.

BACKGROUND OF THE INVENTION

In the manufacture of lamps, i.e., fluorescent, high intensity discharge lamps, a phosphor layer is typically coated on the interior surface of a glass envelope using an aqueous suspension of phosphor powder. The phosphor coating on the interior surface of the glass envelope desirably converts ultraviolet radiation emitted by the mercury discharge to emitted light of the correct color, typically visible illumination having a white color.

Aqueous phosphor coating suspensions are described in many U.S. patents. U.S. Pat. No. 3,833,398 to Schreurs describes a process for improving the adhesion of a phosphor suspension. Calcium halophosphate activated with antimony and manganese is mixed with sub-micron size aluminum oxide particles and an ammonium lignosulfonate solution and the resulting solids separated. The resulting solids are then mixed with an aqueous solution containing polyoxyethylene to form a phosphor coating suspension.

Other patents relating to aqueous phosphor suspensions include the following. U.S. Pat. No. 3,999,993 to Patel et al describes the controlled addition of ammonium hydroxide to an aqueous rare earth phosphor slurry to prevent the formation of rare earth chromate complexes. U.S. Pat. No. 4,148,935 to Schreurs describes a two coat process for a fluorescent lamp. The first coating solution of aluminum oxide contains polyoxyethylene, hydroxyethylmethyl cellulose, and glyoxal. In U.S. Pat. No. 4,340,512 to Schreurs, a temporary organic binder comprises purified carboxy methyl cellulose and polyethylene oxide.

U.S. Pat. No. 5,000,989 to Ford describes the preparation of a fine particle-size aqueous silica coating suspension including an aqueous base such ammonium hydroxide, a defoaming agent, a surface active agent, an insolubilizing agent, and a plasticizer. A pair of water soluble binders, preferably hydroxyethylcellulose and poly (ethylene oxide) are added so that a uniform silica coating results. The above patent is discussed in U.S. Pat. No. 5,051,653 to DeBoer where the above described suspension is utilized to deposit a reflecting layer prior to coating a phosphor layer.

In addition to correct color with good lumen output and adaptability to the coating and baking process of lamp manufacture, the phosphors used in lamps must maintain their light output for thousands of hours. The term "lumen maintenance" is generally used in discussions of this changing light output with time and it is sometimes abbreviated to "maintenance".

Many factors affect lumen maintenance. Glass composition, pressure of gas fill in the lamp, choice of the rare gas, wattage per square inch of phosphor area, chemical additions to the coating suspension, lamp processing procedure, phosphor particle size, and surface treatment are all involved.

When a lamp which has operated for a considerable length of time is opened, the surface layer of the phosphor which is exposed to the arc is likely to be distinctly gray. It is speculated that possible causes of the grayness are absorption of a layer of finely divided metallic mercury, deposition of mercurous oxide, or decomposition of the phosphor with liberation of free metals. Other possible causes are decomposition reactions involving activator centers with migration of the metal to the surface and the forming color centers of various types. Since graying of the phosphor also occurs in high-pressure mercury vapor lamps where phosphor is not exposed to bombardment by mercury ions, it is likely that the graying may be caused by a photochemical reaction. Residual hydrocarbon resulting from incomplete combustion of organic binder can create phosphor discoloration leading to brightness loss. The decomposition of hydrocarbon can lead to further maintenance loss.

In the preparation of lamps from a coating suspension containing a chlorofluorophosphate activated with antimony and manganese, in particular a phosphor having the formula $Ca_5\text{-}x\text{-}ySb_xMn_y(PO_4)_3Cl_zF_{1-x-z}O_x$, there is a loss in weight percentage of halogen in the phosphor. This loss of halogen from the phosphor creates crystal defects that can lead to the formation of color centers and the deterioration of the phosphor resulting in poor lumen maintenance of phosphor. Hence, it desirable to reduce or eliminate hydrocarbons and the loss of halogen from the phosphor during lamp manufacture.

SUMMARY OF THE INVENTION

It is an object of the present invention to minimize the brightness decrease which occurs in lamps having a chlorofluorophosphate phosphor activated with antimony and manganese.

Another object of the present invention is to enhance the retention of halogen in the chlorofluorophosphate activated with antimony and manganese during the lamp manufacturing process.

Another object of the present invention is to improve an aqueous coating suspension so that halogen is desirably retained in the chlorofluorophosphate phosphor activated with antimony and manganese during the lamp manufacturing process.

Another object of the present invention is to catalyze the combustion of organic binders present in the phosphor coating to reduce residual hydrocarbon which remains after the lamp manufacturing process.

This invention achieves these and other results by providing an aqueous coating suspension for a fluorescent lamp comprising particles of an alkaline earth chlorofluorophosphate phosphor activated by antimony and manganese, water, at least one water soluble binder, and additional ingredients such as an oxide adherence promoter, defoaming agent and a surface active agent depending on the desired characteristics of said aqueous suspension, and a sufficient amount of ammonium chloride for improving lamp maintenance.

DETAILED DESCRIPTION

In lamp manufacture the coating suspension is typically applied to the inner surface of the elongated glass bulb by allowing the suspension to flow over the substrate surface or by other known techniques. The coated substrate is then heated at a temperature for a period of time sufficient to remove the water. A baking step is then performed at a temperature sufficient to remove organic components from the binder. Many non-phosphor components are removed from the phosphor coating during this high temperature air oxidation which is known in the art as "lehring".

One of the factors considered during the phosphor coating operation is that the coating be effective to obtain the desired color of emitted light. Phosphor materials generally exhibit good luminescence when stimulated by short (253.7 nanometers) ultraviolet radiation, the response being greatest when the materials are synthesized to produce small deviations from stoichiometry. In particular, activation by combinations of antimony and manganese will produce a wide spectrum of luminescent emissions from alkaline earth phosphates excited by ultraviolet light.

Alkaline earth halophosphates are typically activated by antimony and manganese. They have the general formula $Ca_5\text{-}x\text{-}ySb_xMn_y(PO_4)_3Cl_zF_{1-x-z}O_x$. These phosphors have wide application in fluorescent lamps and may be adjusted in composition to provide white light which varies from "cool" to "warm" white. Typical phosphors are "Warm White", Sylvania™ Type 4300 and "Cool White", Sylvania™ Type 4450.

The aqueous coating suspension of an alkaline earth chlorofluorophosphate phosphor activated by antimony and manganese comprises a slurry of particles of an alkaline earth chlorofluorophosphate phosphor activated by antimony and manganese in water containing at least one water soluble binder. Coating enhancing additives to the slurry may include a defoaming agent, and/or surface active agent. In accordance with the principles of the present invention the slurry includes a sufficient amount of ammonium chloride for improving lamp maintenance. It is believed this result is achieved by catalyzing the organic binder combustion during the baking step in lamp manufacture and by suppressing loss of halogen from the chlorofluorophosphate phosphor during lamp manufacture.

Typical water soluble binders known in the art include carboxymethyl cellulose, hydroxyethyl cellulose, polyacrylic acid or a copolymer of methyl vinyl ether and maleic anhydride. Preferably the water soluble binder is a resin such as poly (ethylene oxide) also referred to as POLYOX and available from Union Carbide as WSRN 3000. The amount of water soluble binder resin utilized based on the weight percent phosphor may be varied according to the desired viscosity required to suit any phosphor coating method known in the art. Typical amounts of poly (ethylene oxide) may vary from about 0.5 to about 10.0 weight percent based on the weight of the phosphor. Preferably the weight percent is from about 3 to about 7, and more preferably from about 4 to about 5.

Additionally, the aqueous coating suspension preferably includes a oxide adherence promoter such as alumina, silica, magnesia or titania. Preferably the suspension includes submicron size aluminum oxide. Aluminum Oxide C (ALON C) manufactured by Degussa, Inc. is the preferred aluminum oxide addition. The typical aqueous suspension preferably comprises from about 2 to about 10 percent by weight of the phosphor in the coating suspension.

A small amount of defoaming agents may be included in the final coating suspension depending on the degree of air entrapment caused by various mechanical devices utilized during the coating process. A typical defoaming agent is Hercules type 831. The amount of defoaming agent utilized based on the volume of the coating suspension is less than 0.04 percent.

Typical surfactants or water surface active agents are well known in the art. One surfactant that has been utilized is type 25R-1 Pluronic from BASF. Another preferred surfactant is Macol-32 available from PPG Mazer Chemical Corporation. Typical surfactants are utilized in amounts less than about 0.004% based upon the volume of the coating suspension.

The amount of water utilized to form a slurry can vary depending on the desired viscosity and specific gravity.

Ammonium chloride may be added directly to the aqueous coating suspension or may be added to the phosphor powder prior to forming the aqueous suspension. The amount of ammonium chloride utilized is an amount effective to improve the maintenance of the resulting fluorescent lamps. Preferably the weight percent of ammonium chloride based on the amount of phosphor is from about 0.5 to about 3 percent.

Additional lumen maintenance improvement is otained with an ammonium chloride addition of about 0.5 to about 3 percent and a phosphor having a Fisher Sub Sieve Size (FSSS) of less than about 5.

EXAMPLE

The various amounts of ammonium chloride based the weight percent of the phosphor as set forth in Table 1 were added to the a coating suspension containing 300 grams of Cool White phosphor type 4450 available from Chem. & Met. Div. of GTE Products Corporation, 6 grams of Alon C, 13 grams of poly (ethylene oxide) (WSRN 3000 from Union Carbide), 0.06 cc. of defoaming agent (Hercules type 831), 0.01 cc. of surfactant (PPG Mazer Macol 32), and 355 grams of deionized water. Two types of suspensions were prepared as set forth above. One suspension utilized the large size calcium chlorofluorophosphate and is reported in TABLE 1. The other suspension utilized the small size calcium chlorofluorophosphate and is reported in TABLE 2. The slurry as prepared above for the suspensions containing the particular phosphor and amounts of ammonium chloride were applied to the inner surface of fluorescent lamp envelopes by causing the suspension to flow down the inner wall of the envelope while being held in a vertical position. After allowing the bulb to drain for a sufficient period of time, e.g., for about 30 seconds, the coated tube was placed in an air drying chamber for 30 minutes to remove the water. The dried coated bulb was baked at about 600° C. for several minutes to remove the organic components of the binders. The coated envelope was then processed into a fluorescent lamp by manufacturing techniques and tested for maintenance with the results set forth in TABLE 1 and TABLE 2.

With larger size calcium chlorofluorophosphate—Cool White, FSSS about 6.4, specific surface area about 0.48 $m^2$/gm, $NH_4Cl$ added to the phosphor coating suspension gives the results reported in TABLE 1.

TABLE 1

| Wt % $NH_4Cl$ added | 100 Hr Lumen | 0–100 Hr % maintenance | Delta % maintenance |
| --- | --- | --- | --- |
| 0.0 | 2907 | 94.3 | 0.0 |
| 0.5 | 2925 | 95.0 | +0.7 |
| 1.0 | 2937 | 95.8 | +1.5 |

With smaller size calcium chlorofluorophosphate—cool white, FSSS about 4.5, specific surface area about 0.58 $m^2$/gm, $NH_4cl$ added to the phosphor powder as a premix blend before putting into coating suspension gives the results reported in table 2.

TABLE 2

| Wt % $NH_4Cl$ added | 100 Hr Lumen | 0–100 Hr % maintenance | Delta % maintenance |
| --- | --- | --- | --- |
| 0.0 | 3039 | 96.1 | 0.0 |
| 0.1 | 3034 | 96.3 | +0.2 |
| 0.5 | 3071 | 97.7 | +1.6 |
| 1.0 | 3103 | 98.5 | +2.4 |

We claim:

1. An aqueous coating suspension for a fluorescent lamp comprising particles of an alkaline earth chlorofluorophosphate phosphor activated by antimony and manganese, water, at least one water soluble binder, and additional ingredients selected from an oxide adherence promotor, defoaming agent and a surface active agent depending on the desired characteristics of said aqueous suspension, and about 0.5 to about 3 percent by weight, based upon the weight of the said phosphor, of ammonium chloride for suppressing halogen loss from said phosphor during lamp manufacture and improving lamp maintenance.

2. An aqueous coating suspension according to claim 1 wherein said water soluble binder comprises poly (ethylene oxide).

3. An aqueous coating suspension according to claim 2 including an oxide adherence promoter comprises submicron size aluminum oxide.

4. An aqueous coating suspension according to claim 3 including a defoaming agent.

5. An aqueous coating suspension according to claim 4 including a surface active agent.

6. An aqueous coating suspension according to claim 1 wherein said chlorofluorophosphate phosphor has a FSSS of less than about 5.

* * * * *